US006852233B1

(12) United States Patent
Sugo et al.

(10) Patent No.: US 6,852,233 B1
(45) Date of Patent: Feb. 8, 2005

(54) METAL-COLLECTING APPARATUS AND METHOD FOR ELUTION AND RECOVERY OF METAL FROM METAL-COLLECTING MATERIAL (75) Inventors: Takanobu Sugo, Gunma (JP); Akio Katakai, Gunma (JP); Noriaki Seko, Gunma (JP); Shin Hasegawa, Gunma (JP); Kunio Fujiwara, Kanagawa (JP); Hiroshi Nagai, Kanagawa (JP); Hideo Kawazu, Kanagawa (JP); Kazuyoshi Takeda, Kanagawa (JP); Satoshi Konishi, Kanagawa (JP); Hideyuki Misawa, Kanagawa (JP); Takashi Kawakami, Kanagawa (JP); Junichi Kanno, Kanagawa (JP); Keiji Hasegawa, Kanagawa (JP); Masaji Akahori, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/926,382

(22) PCT Filed: Apr. 25, 2000

(86) PCT No.: PCT/JP00/02699

§ 371 (c)(1),
(2), (4) Date: Oct. 23, 2001

(87) PCT Pub. No.: WO00/65107

PCT Pub. Date: Nov. 2, 2000

(30) Foreign Application Priority Data

Apr. 27, 1999 (JP) ............................................. 11-119178
Apr. 27, 1999 (JP) ............................................. 11-119181

(51) Int. Cl.$^7$ ................................................. C02F 1/42

(52) U.S. Cl. ....................... 210/672; 210/675; 210/682; 210/688; 210/483; 423/6; 423/20

(58) Field of Search ................................. 210/508, 681, 210/682, 675, 672, 688, 483, 488; 423/1, 6, 20, 80

(56) References Cited

U.S. PATENT DOCUMENTS

| 2,706,701 | A |   | 4/1955 | Beller et al. |
| 2,826,532 | A |   | 3/1958 | Hosmer |
| 2,900,305 | A |   | 8/1959 | Siggia |
| 3,660,283 | A | * | 5/1972 | Ryan ............................ 521/26 |
| 5,126,272 | A | * | 6/1992 | Kingston et al. ............. 436/77 |

FOREIGN PATENT DOCUMENTS

| JP | 51-067216 | 12/1974 |
| JP | 52-138062 | 11/1977 |
| JP | 56-087634 | 7/1981 |
| JP | 58-205545 | 11/1983 |
| JP | 01-141816 | 6/1989 |
| JP | 9-290272 | 11/1997 |

OTHER PUBLICATIONS

Toshiya Takeda, et al., Ind. Eng. Chem. Res., vol. 30, No. 1, pp. 201–206, "Adsorption and Elution in Hollow–Fiber––Packed Bed for Recovery of Uranium From Seawater", 1991.

Takashi Kawakami, et al., Ebara Corporation Report, No. 176, pp. 40–48, "A Study on the Recovery of Rare Metals From Seawater", Jul. 1997(with partial English translation).

Meiji Seika, pp. 1–2, "External Disinfectant Isodine Solution", Feb. 1996 (with partial English translation).

Hans–Uwe Schenck, et al., Journal of Pharmaceutical Sciences, vol. 68, No. 12, pp. 1505–1509, "Structure of Polyvinylpyrrolidone–Iodine (Povidone–Iodine)", Dec. 1979.

* cited by examiner

*Primary Examiner*—Robert A. Hopkins
(74) *Attorney, Agent, or Firm*—Oblon, Spivak, McClelland, Maier & Neustadt, P.C.

(57) ABSTRACT

An object of the present invention is to provide a structure of a metal collecting material for use in seawater or river water or industrial wastewater to give the most excellent adsorption efficiency. Another object of the present invention is to provide a process for efficiently separating and recovering valuable metals or noxious metals from a metal collecting material having collected said valuable metals from seawater or noxious metals from river water or wastewater with the least possible waste generation.

A metal collector according to an aspect of the present invention is formed by stacking at least partially alternate layers of a fibrous metal collecting material with a spacer for introducing a liquid to be treated into said collecting material, wherein the area of spacer side faces represents 25–75% of the total area of collecting material side faces and spacer side faces in the side faces of the stack. A process for eluting and recovering a metal from a metal collecting material according to another aspect of the present invention comprises the steps: (1) contacting the metal collecting material having absorbed a metal with a dilute eluent, (2) contacting the metal collecting material with an eluent more concentrated than in step 1 to recover the metal into the eluent; and (3) contacting a metal resorbing material with the eluate from step 2 to resorb the metal.

22 Claims, 3 Drawing Sheets

METAL-COLLECTING APPARATUS AND METHOD FOR ELUTION AND RECOVERY OF METAL FROM METAL-COLLECTING MATERIAL

FIELD OF THE INVENTION

An aspect of the present invention relates to a structure of metal collector using a fibrous collecting material for use in water to collect a metal in a liquid medium such as seawater or river water. The metal collector using a fibrous collecting material of the present invention can be used to collect valuable metals such as uranium, vanadium or titanium contained in seawater as well as to remove noxious heavy metal ions from seawater or river water or industrial wastewater.

Another aspect of the present invention relates to a process for efficiently separating and recovering valuable metals or noxious metals from a metal collecting material having collected said valuable metals from seawater or noxious metals from river water or wastewater with the least possible waste generation.

PRIOR ART

Conventional means for adsorbing and removing minor amounts of noxious substances or valuable metals from large amounts of aqueous media such as seawater or river water typically involves passing seawater or river water through a column or the like packed with a granular adsorbent such as an ion exchange resin to remove the noxious substances or valuable metals.

Especially, seawater is rich in valuable metals such as uranium, titanium, cobalt and vanadium. If these almost totally imported metals could be collected from seawater, a long-cherished Japanese wish for self-supply of energy would be fulfilled and oversea dependence on valuable rare metals would be decreased, and it would also contribute to protection of the global environment.

Attempts to collect valuable metals in seawater were made in about 1960 in the UK and in early 1970s in Japan. These attempts used a collecting material based on titanic acid, which had low collecting capacity or collecting speed and insufficient durability. Therefore, economically more advantageous means were sought but no techniques for collecting valuable metals from seawater have been developed from the viewpoint of protection of the global environment, resource/energy saving and guarantee of long-term energy sources. For example, the method for introducing seawater into a collector by column circulation to recover uranium had the problem that pumping power accounts for most of the energy of recovered uranium. Studies showed that 50% or more of the energy of uranium collected from seawater by adsorption to a granular adsorbent was consumed for pumping power during collection. Thus, it is essential in this field to utilize natural energy such as ocean current or stream current.

In early 1970s, amidoxime groups were found to be effective for collecting valuable metals such as uranium. In early 1980s, functional materials were extensively developed by radiation-induced graft polymerization, and collecting materials incorporating an amidoxime group into a graft side chain of existing polyolefin fibers were proposed to further improve performance.

With the technical progress as described above and the social background demanding protection of the global environment and resource/energy saving, the necessity of developing the technology for collecting/recovering valuable metals in seawater was stressed again in 1990s.

Fibrous metal collecting materials comprising a fibrous material having a metal-adsorbing function have a large surface area and are effective for adsorbing/removing minor metal ions in aqueous media such as seawater or river water. However, fibrous collecting materials are so bulky that aqueous media to be treated cannot be sufficiently directed to the vicinity of the collecting materials unless some measures are taken to successfully support them in aqueous media such as seawater or river water.

If a large channel is provided in a metal collector incorporating a metal collecting material to direct aqueous media such as seawater or river water, the amount of the collecting material that can be contained in the collector decreases and therefore, the amount of metals collected by the collector as a whole decreases. If the amount of the collecting material in the collector is increased, however, the amount of aqueous media flowing into the collector decreases and therefore, the amount of metals collected by the collector as a whole also decreases.

Thus, there were demands for finding the structure of a metal collecting material for use in seawater or river water or industrial wastewater to give the most excellent adsorption efficiency.

In order to efficiently collect and recover valuable metals from seawater to commercially utilize them, it is important not only to develop an excellent metal collecting material but also to develop a process for eluting/recovering a target metal from the collecting material having collected said metal. For example, if a metal is eluted from the collecting material but not effectively recovered and discarded, the collected metal cannot be effectively utilized. Metal collecting materials can also be used to collect and remove noxious heavy metals or the like from river water or industrial wastewater, in which case the collected metals are eluted and individually recovered and treated while the collecting materials are recycled. If some of the metals are not recovered but discarded during elution, they may invite the problems of environmental pollution or the like.

Considering the importance of these problems, we carefully studied to find a process for eluting/recovering a metal from a metal collecting material having adsorbed and collected said metal with the least possible waste generation and energy consumption.

No process has existed yet for efficiently eluting a metal from a metal collecting material having adsorbed said metal with the least possible waste generation.

Stepwise elution with an eluent at an increasing concentration has been common in the field of ion exchange. For example, when raw water rich in calcium ion is ion-exchanged and regenerated with sulfuric acid, a regeneration method is adopted starting with sulfuric acid at a low concentration and then stepwise increasing the concentration to prevent formation of gypsum ($CaSO_4$), thereby completing regeneration through several stages, and called as stepwise regeneration. However, this method was intended to ensure normal regeneration by removing the cause of clogging, but not to positively separate and recover adsorbed substances.

Not only how to use the eluent but also the elution characteristics of the collecting material has an important influence on efficient elution and recovery. Conventional ion exchange resins have a three-dimensional network structure consisting of styrene skeletons crosslinked with divinylbenzene to form a rigid polymer chain and ion exchange groups such as sulfone group or quaternary ammonium group are introduced into said rigid polymer chain, whereby they have low ion adsorption speed or diffusion speed. Therefore, diffusion speed of regenerants into the ion exchange resins after adsorption is also low, which means low regeneration efficiency as well as low separation efficiency between adsorbed ions, eg, between divalent metal ions such as calcium ion and monovalent metal ions such as sodium ion. This problem applies to not only the field of ion exchange but also the field of adsorption and elution of metals to which the present invention pertains.

Therefore, an object of the present invention is to provide a novel structure of metal collector using a fibrous collecting material for use in water to collect a metal in a liquid medium such as seawater or river water, and another object is to provide a process for efficiently separating and recovering valuable metals or noxious metals from a metal collecting material having collected said valuable metals from seawater or noxious metals from river water or wastewater with the least possible waste generation.

DISCLOSURE OF THE INVENTION

In order to solve the above problems, an aspect of the present invention relates to a metal collector formed by stacking at least partially alternate layers of a fibrous metal collecting material with a spacer for introducing a liquid to be treated into said collecting material, wherein the area of spacer side faces represents 25–75% of the total area of collecting material side faces and spacer side faces in the side faces of the stack. The present invention also relates to a method for collecting a metal in a stream current, comprising placing said metal collector in the stream current.

Another aspect of the present invention relates to a process for eluting and recovering a metal from a metal collecting material comprising the steps of: (1) contacting the metal collecting material having adsorbed a metal with a dilute eluent, (2) contacting the metal collecting material with an eluent more concentrated than in step 1 to recover the metal in the eluent; and (3) contacting a metal resorbing material with the eluate from step 2 to resorb the metal.

THE MOST PREFERRED EMBODIMENTS OF THE INVENTION

Each aspect of the present invention will now be explained in detail below. A metal collector according to an aspect of the present invention is first explained in detail. As described above, a metal collector according to an aspect of the present invention is formed by stacking at least partially alternate layers of a fibrous metal collecting material with a spacer for introducing a liquid to be treated into said collecting material, wherein the area of spacer side faces represents 25–75% of the total area of collecting material side faces and spacer side faces in the side faces of the stack.

The fibrous collecting material is preferably in the form of a sheet such as a woven or nonwoven fabric. Preferably, these sheets of the fibrous collecting material are stacked with a spacer inserted every other one or at regular intervals so that an aqueous medium is introduced into the collector via said spacer to come into contact with the collecting material. That is, the metal collector of the present invention is preferably arranged in such a manner that the flow of the aqueous medium strikes the side faces of the stack of the metal collector and enters into the collector from the side faces of the spacer to flow in the collector along the spacer, i.e., it is arranged in parallel flow in the flow of a liquid to be treated so that much aqueous medium can be introduced into the collector.

The metal collector of the present invention is further wherein the ratio of the area of spacer side faces to the total area of collecting material side faces and spacer side faces in the side faces of a stack of layers of the collecting material and spacer (hereinafter referred to as "opening area ratio") is 25–75%. When the opening area ratio is increased in a metal collector having a certain size consisting of a stack of layers of a collecting material and a spacer, i.e., when the ratio of the thickness of the spacer to the thickness of the collecting material is increased, a larger channel is ensured in the collector so that more aqueous medium can be introduced into the collector, but the amount of the collecting material in the collector as a whole decreases and therefore, the amount of metals collected by the collector as a whole decreases. When the opening area ratio is decreased, i.e., when the ratio of the thickness of the spacer to the thickness of the collecting material is decreased, the amount of the collecting material in the collector increases, but less aqueous medium enters into the collector and therefore, the amount of metals collected by the collector as a whole decreases. Noting these facts, we studied to search for the optimum opening area ratio, with the result that we accomplished the present invention on the basis of the finding that the amount of metals collected by the collector as a whole can be remarkably increased in the form of a peak while decreasing the amount of the collecting material in the metal collector as a whole by selecting an opening area ratio of 25–75%.

In the metal collector of the present invention, the opening area ratio is more preferably 40–60%.

The fibrous collecting material used in the metal collector of the present invention is preferably in the form of a woven and/or nonwoven fabric to keep the large surface area characteristics of fibers and to provide good handling properties. Particularly when a nonwoven fabric is used, it is preferably formed by heat fusion of a fiber. Such a nonwoven fabric formed by heat fusion scarcely undergoes fiber detachment or strength loss because fiber strands are joined together at their contact points.

The fibrous metal collecting material used in the metal collector of the present invention is a fibrous material such as a nonwoven fabric having a metal adsorbing function. Such materials having a metal adsorbing function include, for example, polymer materials having an amidoxime group or an imidodioxime group which has an ability to adsorb valuable metals such as uranium, vanadium and titanium; polymer materials having an iminodiacetate group which has an ability to adsorb iron, copper, cobalt, nickel or the like; and polymer materials having a thiol group which has an ability to adsorb mercury.

Amidoxime and imidodioxime groups are very preferred functional groups to be introduced into the collecting material contained in the metal collector of the present invention because of their high stability constant for complexation with valuable metals such as uranium, vanadium and titanium in seawater. The amidoxime chelate functional group is said to be readily converted into an imidodioxime group via deammoniation, but either functional group can be used in the collecting material of the present invention.

The performance of high-performance collecting materials is also greatly influenced by the structure of the polymer chain of the substrate. For example, said functional groups can be introduced into a polymer substrate having a skeleton of a three-dimensional network structure such as polystyrene crosslinked resins. However, collecting materials are preferably graft polymerization materials obtained by graft-polymerizing a polymerizable monomer having a desired functional group on a backbone of a polymer substrate, considering adsorption speed and diffusion speed. When a polymerizable monomer (graft monomer) having a functional group is thus grafted on a backbone of a substrate, high adsorption speed and diffusion speed can be obtained because mobility is very high in the absence of crosslinkage of graft chains. Thus, materials incorporating an amidoxime group or imidodioxime group on a backbone of a polymer substrate are especially excellent for efficiently adsorbing uranium present in an amount as small as 3 ppb in seawater that is a high saline solution and other valuable metal ions and fractionally eluting them at high efficiency.

The method to be used in the present invention for graft-polymerizing a polymerizable monomer having a desired functional group to a polymer substrate is preferably radiation-induced graft polymerization. Radiation-induced graft polymerization is a method that permits a desired graft polymer side chain to be introduced into a polymer substrate by irradiating the substrate to produce a radical and reacting it with a graft monomer, and characterized in that the number or length of the graft chain can be relatively freely controlled and the polymer side chain can be introduced into existing polymer materials in various shapes including woven or nonwoven fabrics which are most preferred substrates for use in the present invention. Therefore, this is the most preferred method for the purpose of the present invention.

Radiations that can be used in radiation-induced graft polymerization well suitable for the purpose of the present invention include α-rays, β-rays, γ-rays, electron rays, UV ray, etc., among which γ-rays and electron rays are preferred for use in the present invention. Radiation-induced graft polymerization includes pre-irradiation graft polymerization involving preliminarily irradiating a graft substrate and then bringing it into contact with a polymerizable monomer (graft monomer) for reaction, and simultaneous irradiation graft polymerization involving simultaneously irradiating a substrate and a monomer, both of which can be used in the present invention. Radiation-induced graft polymerization also includes various manners of contact between a monomer and a substrate, such as liquid phase graft polymerization performed with a substrate immersed in a monomer solution, gas phase graft polymerization performed with a substrate in contact with the vapor of a monomer, or immersion gas phase graft polymerization performed by immersing a substrate in a monomer solution and then removing it from the monomer solution for a reaction in a gas phase, any of which can be used in the present invention.

As already described above, woven/nonwoven fabrics are the most preferred materials for use as a substrate for collecting materials in the present invention, and are well suitable for use in the immersion gas phase graft polymerization because they tend to retain monomer solutions.

In order to obtain a collecting material of the present invention by graft-polymerizing a polymerizable monomer having an amidoxime group or an imidodioxime group to a substrate via radiation-induced graft polymerization, for example, a polymerizable monomer having a nitrile group can be used as a graft monomer to conduct graft-polymerization, and then reacted with a hydroxylamine to convert the nitrile group into an amidoxime group or an imidodioxime group.

Figure 3:
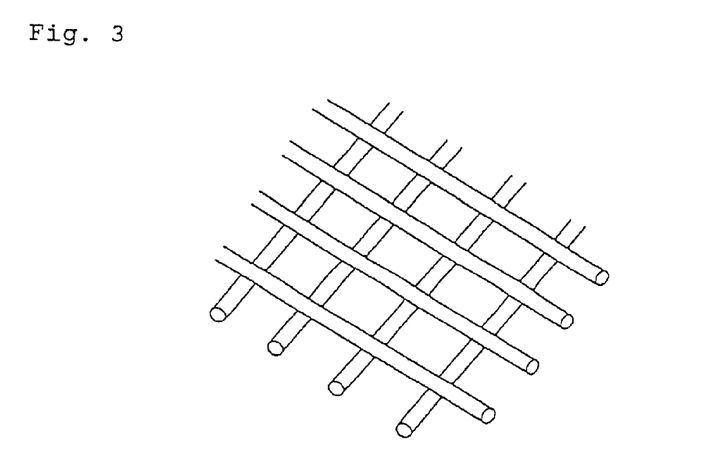
FIG. 3 shows the configuration of an example of a spacer that can be used in a metal collector according to an aspect of the present invention.

Suitable spacers to be stacked with collecting materials in metal collectors of the present invention may be in any form that allows a stream of water to be introduced into the collectors from side faces of the spacers and to flow in contact with the collecting materials along the spacers, but preferably in the form of a diagonal net as shown in FIG. 3 considering flow resistance and diffusion of the stream. Materials for spacers include, but not limited to, polyolefin-based polymers such as polyethylene or polypropylene and polyesters.

Figure 1:
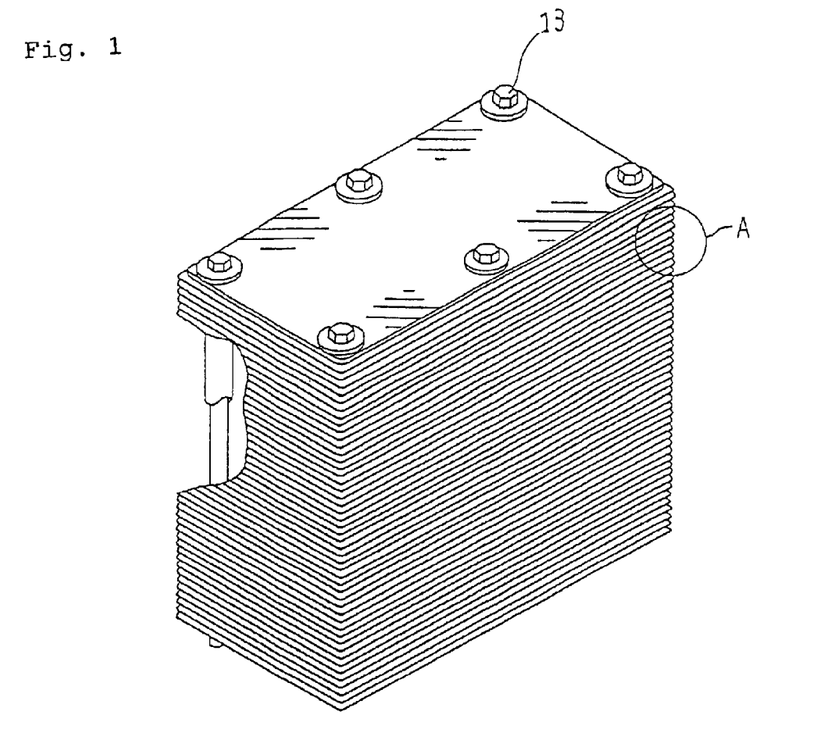
FIG. 1 is a general view of a metal collector according to an aspect of the present invention.
Figure 2:
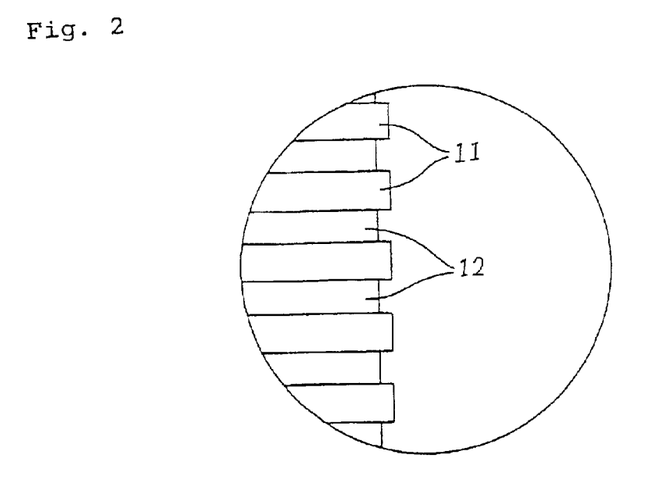
FIG. 2 is a partial enlarged view of FIG. 1.

The structure of a metal collector according to an aspect of the present invention is explained with reference to FIGS. 1 and 2. FIG. 1 is a general view of a metal collector according to an aspect of the present invention, and FIG. 2 is an enlarged view of part A of FIG. 1. The metal collector of the embodiment shown in FIG. 1 is formed by alternately stacking layers of a metal collecting material consisting of a nonwoven fabric 11 with a spacer 12 and fixing the stack with fastening members 13. When this collector is moored in a sea area having an ocean current with the side faces of the stack being horizontally oriented, for example, seawater is introduced into the collector along the spacer from the side faces of the stack, i.e., from any horizontal direction of the collector while little seawater flows in the vertical direction of the collector. The seawater introduced into the collector is diffused by the spacer and comes into contact with the collecting material, whereby metals contained in the seawater is adsorbed to the collecting material.

Metal collectors of the present invention can be packed in a basket made of a metal net, for example, and moored in seawater or river water.

The number of layers of the collecting material, the size and shape of the collecting material, the thickness per layer of the collecting material, the thickness of the spacer and the like are determined taking into consideration the number of days for which collectors are moored, the target level of metals to be collected, how to elute the metals collected, the speed of the ocean current, water temperature, handling properties or other factors.

The place in which metal collectors of the present invention are immersed should have some speed of stream current. Metal collectors of the present invention are immersed in this stream current preferably for several to several tens of days, and therefore, the thickness of the collecting material and others must be determined taking into consideration shape retention of the collecting material and deposition of organisms during then, and shape retention and handling properties during various processes such as removal of deposited organisms by washing during recovery of the collecting material or elution. Diffusion of stream into collectors also must be considered. In these respects, the thickness per layer of the collecting material is preferably about 0.5–3.0 mm, and the thickness of the spacer is preferably about 0.5–5.0 mm. Obviously, preferred thicknesses of these components vary with the shape (longitudinal and width dimensions) of the collector. If the thickness per layer of the collecting material exceeds 3.0 mm, aqueous media insufficiently penetrate into the collecting material so that the internal functional group cannot be effectively utilized and the amount of metals collected per unit weight of the collecting material may decrease. Assemblies of thin sheets of the collecting material may be alternately stacked with spacers. That is, layers of the collecting material and spacer may be alternately stacked at least in part. In this case, each assembly of thin sheets of the collecting material preferably has a thickness in the above range.

Metal collectors of the present invention can be used, for example, in an ocean current to collect valuable metals such as uranium, vanadium or titanium in seawater, or can be used in river water to collect and remove noxious metals such as cadmium, lead or copper in the river water, or can be used in industrial wastewater to collect and remove noxious metals such as mercury or remove nickel from nickel plating wastewater.

Next, a process for eluting and recovering a metal from a metal collecting material according to another aspect of the present invention is described in detail. As described above, a process for eluting and recovering a metal from a metal collecting material according to another aspect of the present invention comprises the steps of: (1) contacting the metal collecting material having adsorbed a metal with a dilute eluent, (2) contacting the metal collecting material with an eluent more concentrated than in step 1 to recover the metal into the eluent; and (3) contacting a metal resorbing material with the eluate from step 2 to resorb the metal.

As an example, a process of the present invention for eluting and recovering valuable metals such as uranium or vanadium adsorbed and collected from a metal collecting material consisting of a chelate resin based on an amidoxime group used to adsorb and collect said valuable metals from seawater is explained below. The process for recovering uranium or the like from a collecting material having adsorbed and collected uranium or the like from seawater as illustrated below is only an example to which the present invention can be applied, but those skilled in the art can readily appreciate that the present invention can also be applied to recover other metals from a collecting material having collected such metals.

In a process according to an embodiment of the present invention, a metal collecting material consisting of a chelate resin based on an amidoxime group, which has been immersed in seawater for several tens of days to adsorb uranium or vanadium or the like, is brought into contact with a dilute eluent such as 0.01–0.1 N hydrochloric acid. With such dilute hydrochloric acid, magnesium and calcium are initially eluted while uranium and vanadium are not eluted. Then, the collecting material is brought into contact with an eluent more concentrated than the first eluent at step 2. When the collecting material is brought into contact with 0.5 N hydrochloric acid, for example, 90% or more of uranium adsorbed to the collecting material is eluted. The uranium level in the eluate is in the order of several tens of ppm, which means that the seawater level of 3 ppb can be concentrated 10000-fold. The eluate from step 2 contains little impurities such as magnesium and calcium, showing that purification also took place.

The type of the eluent is appropriately selected depending on the nature of the target metal to be recovered, how to purify the recovered metal, elution tendency, the nature of the functional group or durability. When the target metal to be recovered is uranium or vanadium, for example, hydrochloric acid is preferably used as an eluent. When noxious heavy metals such as nickel or copper have been collected with a collecting material having an iminodiacetate functional group, hydrochloric acid or sulfuric acid is preferably used as an eluent. The first eluent should be used at a concentration that allows non-target metals to be eluted but not target metals, and the second eluent should be used at a concentration that allows target metals to be eluted. This varies with the type of the eluent used, the nature of the metal to be recovered, the nature of the non-target metal to be removed during the first elution step, contaminant deposition condition in operation environment, etc., and can be experimentally determined by preliminary tests. When hydrochloric acid is used as an eluent to recover uranium, for example, it is preferable that the first eluent is at a concentration of 0.01–0.1 N and the second eluent is at 0.2–1 N.

Then, the uranium-containing eluate from step 2 is adsorbed to a metal-resorbing material which is different from the collecting material. This allows further concentration and purification of uranium. The metal resorbing materials suitable for use in step 3 can be selected from those having a chelating group having a high stability constant for complexation with uranium in acidic solutions. Obviously, the type of the metal resorbing material used depends on the nature of the target metal, and those skilled in the art can readily determine which type of metal resorbing material is preferred for which kind of metal. Suitable metal resorbing materials can be in the form of a bead-like resin, fiber material, woven or nonwoven fabric material, net material, sponge material, plate material, film material or processed product thereof.

Chelate resins can be preferably used as collecting and metal resorbing materials. Chelate resins used for this purpose may have a skeleton of a three-dimensional network structure obtained by crosslinking polystyrenes, but chelate resins based on graft polymerization are more advantageous in the respects of adsorption speed, diffusion speed in eluent, separation efficiency from other metals, etc. Materials having a functional group especially having affinity for a specific metal such as inclusion compounds can also be used as collecting materials and/or metal resorbing materials.

The process of the present invention can further comprises, between steps 1 and 2, the step of contacting the collecting material with an eluent having a concentration higher than that of the eluent in step 1 but lower than that of the eluent in step 2. The metal collecting material can also collect other valuable metals than uranium contained in seawater such as vanadium, titanium or cobalt. When the concentration of the eluent to be contacted with the collecting material is stepwise increased, a specific metal ion is eluted in response to the concentration. This method can prevent other metal ions from being included in the eluate of the target metal to be recovered. In this case, the concentration of the eluent used in each elution step should be selected to elute only a desired specific metal ion. Such a concentration varies with the nature of the metal ion to be recovered or the type of the eluent used, but can be experimentally determined by preliminary tests. In this embodiment, the eluate of a specific metal ion from each step is used to resorb the target metal to a metal resorbing material at step 3.

In the process of the present invention, the eluate from step 1 and/or the eluate from step 3 (the eluent having been used to resorb the target metal to a metal resorbing material)

can be used as a washing solution for the collecting material before step 1. A mass of marine organisms and secretes or dead bodies thereof are deposited on the collecting material immersed in seawater for a long period. These deposits can be largely removed by contact with an aqueous solution having a composition different from the composition of seawater. The reason for this is unknown, but seems to be influenced by osmosis or pH. Therefore, the collecting material is desirably washed before step 1 of the process of the present invention. The washing solution used for this purpose may be the eluate from step 1 or the eluent having been used for metal resorption treatment in step 3 after the concentration is appropriately adjusted.

The eluent having been used for metal resorption treatment in step 3 of the process of the present invention has a concentration somewhat lower than the concentration of the eluate from step 2, and thus can be used as an eluent in step 1 after it is appropriately diluted.

By adopting these procedures, the eluate from step 1 and/or 3 can be effectively recycled in the process.

In the process of the present invention, the metal resorbing material to which the target metal has been resorbed during step 3 contains the target metal highly concentrated. The resin can be removed and disassembled to recover the target metal. An eluent further concentrated than the eluent used in step 3 can also be brought into contact with the metal resorbing material to which the target metal has been resorbed to recover said metal in the eluent.

As an example, the metal collecting material that can be treated by the process of the present invention is a metal collecting material containing an amidoxime group and/or imidodioxime group as a functional group. The amidoxime chelate functional group is the most preferred chelate functional group for the purpose of recovering uranium from seawater because of the high stability constant for complexation with valuable metals such as uranium in seawater. The amidoxime group is said to be readily converted into an imidodioxime group via deammoniation, but either functional group can be used for the metal collecting material. The collecting material having such a functional group can be moored in an ocean current to collect valuable metals such as uranium in seawater with the aid of natural current such as ocean current. Other examples of metal collecting materials include collecting materials having an iminodiacetate group for adsorbing iron, copper, cobalt or nickel, and collecting materials having a thiol group for adsorbing mercury.

As an example, the metal collecting material that can be treated by the process of the present invention may be in the form of a woven or nonwoven fabric material consisting of a fiber assembly. Collecting materials in the form of a woven or nonwoven fabric take advantage of the large surface area of fibers and are convenient for the adsorption system linked to ocean current because woven or nonwoven fabrics can be easily shaped into any form. The amount of valuable metals adsorbed increases as the amount of seawater flown into the collecting material increases. In the case of conventional bead-like resins, the inflow amount of seawater was small because they were used in a packed column system suffering large pressure losses.

The metal collecting material that can be treated by the present invention is preferably obtained by introducing a polymer side chain having a desired chelate functional group onto a backbone of a polymer substrate via radiation-induced graft polymerization. Adsorption and elution characteristics of the metal collecting material is significantly influenced by not only the type of the chelating group but also the structure of the polymer chain. The graft side chain introduced onto a backbone of a polymer substrate as described above is not crosslinked, so that high adsorption speed and diffusion speed can be obtained because of very high mobility. Thus, such a material is especially excellent for efficiently adsorbing uranium present in an amount as small as 3 ppb in seawater that is a high saline solution and other valuable metals and fractionally eluting them at high efficiency.

Radiation-induced graft polymerization is the most preferred method for the purpose of the present invention, because it is a method that permits a desired graft polymer side chain to be introduced into a polymer substrate by irradiating the substrate to produce a radical and reacting it with a graft monomer and characterized in that the number or length of the graft chain can be relatively freely controlled and the polymer side chain can be introduced into existing polymer materials in various shapes including woven or nonwoven fabrics.

Radiations that can be used in radiation-induced graft polymerization include $\alpha$-rays, $\beta$-rays, $\gamma$-rays, electron rays, UV ray, etc., among which $\gamma$-rays and electron rays are especially preferred. Radiation-induced graft polymerization includes pre-irradiation graft polymerization involving preliminarily irradiating a substrate and then bringing it into contact with a polymerizable monomer for graft polymerization reaction, and simultaneous irradiation graft polymerization involving simultaneously irradiating a substrate and a polymerizable monomer, both of which can be used for the preparation of metal collecting materials to be treated by the process of the present invention.

When a metal collecting material in the form of a nonwoven fabric containing an amidoxime group and/or imidodioxime group is used as a metal collecting material that can be treated by the process of the present invention, for example, the amidoxime group and/or imidodioxime group can be formed by graft-polymerizing a polymerizable monomer (graft monomer) consisting of acrylonitrile and amidoximizing it with hydroxylamine or the like.

The process for eluting and recovering a metal from a metal collecting material according to the above embodiment of the present invention is explained with reference to the drawing.

Figure 5:
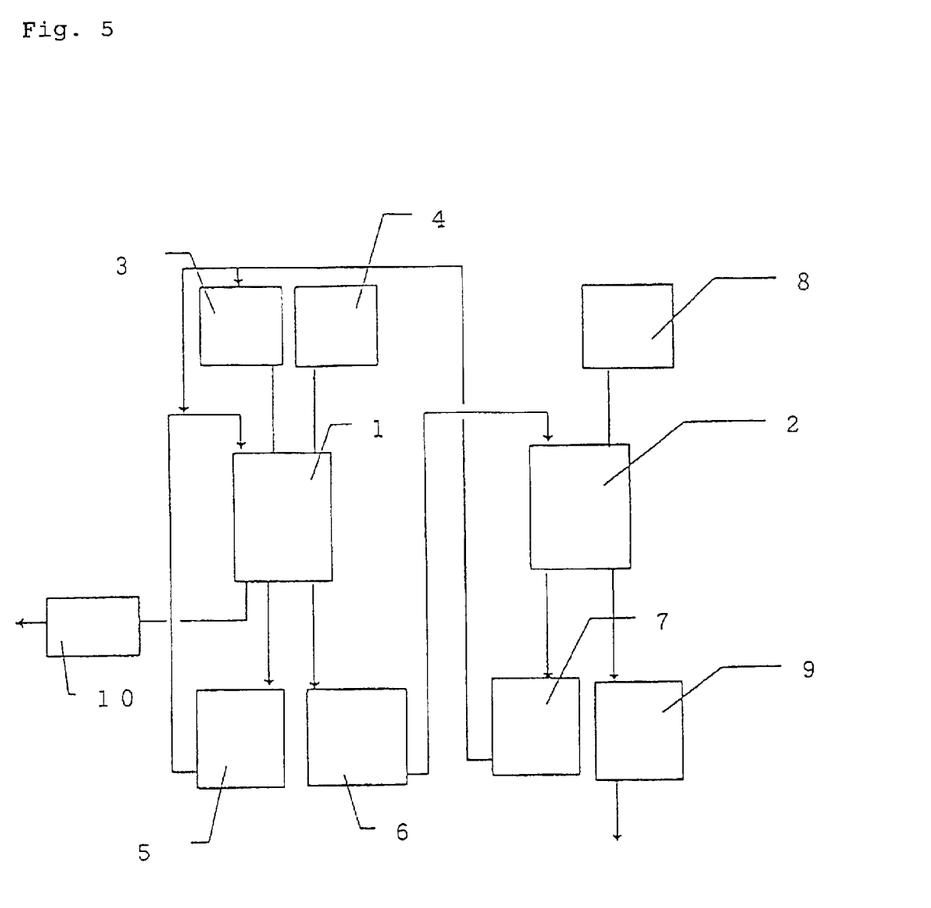
FIG. 5 is a flow sheet of a metal recovery process according to another aspect of the present invention.

FIG. 5 is a flow sheet showing a process according to an embodiment of the present invention. A process for recovering a valuable metal such as uranium or vanadium from seawater is explained along the flow sheet. In FIG. 5, various reference numbers represent the following elements: 1: metal collecting material elution tank (steps 1 and 2); 2: metal resorbing material tank (step 3): 3: first eluent; 4: second eluent; 5: storage tank for eluate from step 1; 6: storage tank for eluate from step 2; 7: waste liquor after resorption from step 3: 8: eluent for metal resorbing material; 9: eluate of metal resorbing material; 10: effluent treatment equipment.

Metal collecting materials having adsorbed valuable metals in seawater after mooring in an ocean current for a given period are packed into metal collecting material elution tank 1. Collecting materials on which a mass of marine organisms or secretes are deposited can be washed with eluate 5 from step 1 to remove the deposits. Waste liquor 7 after resorption from step 3 may be appropriately diluted and used as a washing solution. The washing waste liquor from this washing step is discharged after some water treatment to meet a regulatory value for effluent in effluent treatment equipment 10 because it contains solids or organic matters derived from organisms. Although washing takes place in elution tank 1 in FIG. 5, washing may also take place in another washing tank not shown when washing efficiency is low.

Washed metal collecting materials are brought into contact with a first dilute eluent 3 such as dilute hydrochloric acid of 0.1 N or less to elute and remove calcium or magnesium (step 1). The eluate containing calcium or magnesium at high level from this step can be stored in storage tank 5 for eluate from first step and used as a washing solution in the next process.

Then, the collecting materials are brought into contact with a second eluent 4 more concentrated than the first eluent such as hydrochloric acid of 0.5 N or more to elute a valuable metal such as uranium or vanadium (step 2). The eluate is stored in storage tank 6. This eluate contains a valuable metal such as uranium or vanadium at some concentration (in the order of several ppm to several tens of ppm). In step 2, a driving solution is preferably further passed after the eluent to drive the eluent remaining in the collecting materials. The driving solution used for this purpose may be water or optionally tap water-treated water or seawater.

In order to further concentrate the valuable metal in eluate 6 from step 2, eluate 6 is passed through metal resorbing material tank 2. Metal resorbing material tank 2 is packed with a chelate resin or the like capable of resorbing the target metal. When uranium is to be recovered, for example, metal resorbing material tank 2 can be packed with a resin based on an amidoxime group. In metal resorbing material tank 2, the target metal is resorbed to the resin (step 3). Effluent 7 from step 3 is somewhat less concentrated than the second eluent because it contains the driving solution and washing solution, but it is sufficiently useful as the first eluent so that it can be used as first eluent 3 by appropriately adjusting the concentration. Alternatively, effluent 7 can be used as a washing solution before step 1.

The target metal resorbed on the metal resorbing material can be directly recovered by disassembling the resin. Alternatively, the resin can be contacted with a further concentrated eluent 7 such as further concentrated hydrochloric acid (for example, 1–5 N) to elute the metal adsorbed on the resin in eluate 9 again. The target metal is contained at a very high level in eluate 9 so that it can be recovered by methods known in the art.

EXAMPLES

Each aspect of the present invention is explained in detail by way of example below. The following examples are intended to illustrate but not to limit the present invention.

Example 1

Preparation of a Metal Collecting Material

A nonwoven fabric having an areal density of 60 g/m$^2$ made of a polyethylene fiber of 10–20 μm in diameter was irradiated with γ-rays at 150 kGy in a nitrogen atmosphere and then immersed in a mixed monomer solution of acrylonitrile and methacrylic acid at 50° C. for 6 hours for graft polymerization. Then, the nonwoven fabric was immersed in dimethylformamide for washing at 50° C. for 3 hours and then weighed to give a grafting degree of 132%.

The grafted nonwoven fabric obtained above was immersed in a mixed solution of 50% methanol and 50% water containing 3% hydroxylamine hydrochloride and heated at 80° C. for 1 hour for amidoximation. Then, the nonwoven fabric was immersed in a 2% potassium hydroxide solution for alkaline treatment at 80° C. for 1 hour. This nonwoven fabric was thoroughly washed with pure water. The resulting metal collecting material had a thickness of 1.05 mm.

Construction of a Metal Collector

Layers of each of the metal collecting material having a thickness of 1.05 mm obtained above and a polyethylene spacer in the form of an diagonal net (having the structure shown in FIG. 3) having various thicknesses shown in Table 1 were alternately stacked and joined together by fastening members to form an uranium collector of 290 mm×150 mm×275.4 mm thick having the structure shown in FIG. 1.

Collection and Recovery of Uranium in Seawater

A basket made of a stainless net containing units of the uranium collector formed above was immersed in a sea area having an ocean current flowing at about 1 m/sec (about 3 m below the sea level) for 20 days. The seawater uranium level in this sea area was 3.1 ppb.

After immersion for 20 days, the uranium collectors were pulled up from the sea and the collecting materials were washed with pure water. Then, the collectors were packed in an elution column. The column was eluted with 100 liters of 0.5 N hydrochloric acid to recover the collected uranium. After elution and recovery, the collectors were disassembled and the collecting materials were removed to determine uranium uneluted at 0.5 N, which showed that 95% or more of the collected uranium was dissociated.

Figure 4:
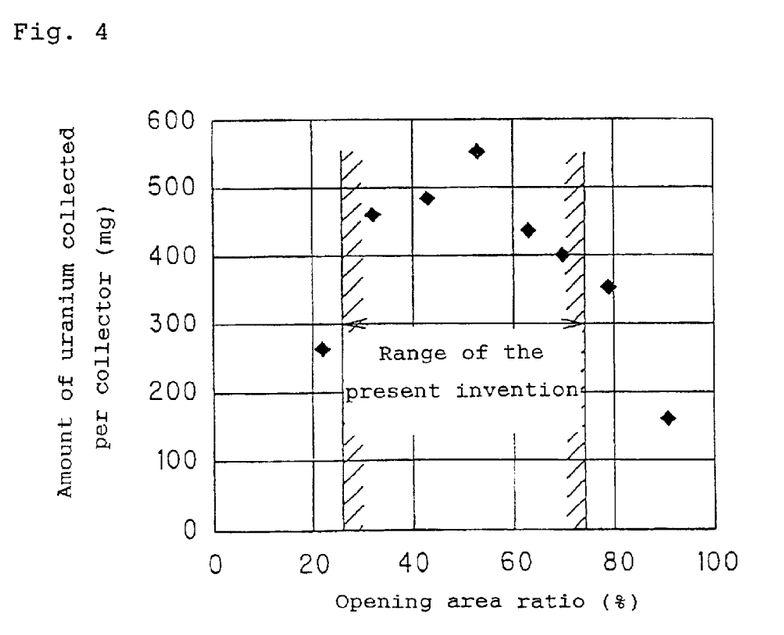
FIG. 4 is a graph showing the relation between the amount of uranium collected per collector and the opening area ratio in the example according to an aspect of the present invention.

The amount of thus recovered uranium is shown in Table 1. The amount of uranium collected per collector is shown in FIG. 4, which demonstrates that the amount of uranium collected per collector is remarkably high in the form of a peak when the opening area ratio is within the range of the present invention of 25–75%.

TABLE 1

| Spacer (mm) | Number of collecting materials | Opening area ratio (%) | Total weight of collecting materials (g) | Eluted uranium (mg) | Adsorbed uranium per unit weight of collecting materials (μg/g) | Collected uranium per collector (mg) |
|---|---|---|---|---|---|---|
| 0.3 | 205 | 22 | 1330 | 264 | 198 | 263 |
| 0.5 | 176 | 32 | 1129 | 460 | 407 | 460 |
| 0.8 | 151 | 43 | 979 | 485 | 495 | 485 |
| 1.2 | 122 | 53 | 790 | 555 | 703 | 555 |
| 1.8 | 94 | 63 | 622 | 436 | 701 | 436 |

TABLE 1-continued

| Spacer (mm) | Number of collecting materials | Opening area ratio (%) | Total weight of collecting materials (g) | Eluted uranium (mg) | Adsorbed uranium per unit weight of collecting materials (μg/g) | Collected uranium per collector (mg) |
|---|---|---|---|---|---|---|
| 2.5 | 76 | 70 | 490 | 401 | 818 | 400 |
| 4 | 53 | 79 | 348 | 353 | 1014 | 353 |
| 10 | 25 | 91 | 156 | 162 | 1038 | 162 |

Example 2
Preparation of a Metal Collecting Material

A nonwoven fabric having an areal density of 60 g/m² made of a polyethylene fiber of 10–20 μm in diameter was irradiated with γ-rays at 150 kGy in a nitrogen atmosphere and then immersed in a mixed monomer solution of acrylonitrile and methacrylic acid at 50° C. for 6 hours for graft polymerization. Then, the nonwoven fabric was immersed in dimethylformamide for washing at 50° C. for 3 hours and then weighed to give a grafting degree of 132%.

The grafted nonwoven fabric obtained above was immersed in a mixed solution of 50% methanol and 50% water containing 3% hydroxylamine hydrochloride and heated at 80° C. for 1 hour for amidoximation. Then, the nonwoven fabric was immersed in a 2% aqueous potassium hydroxide solution for alkaline treatment at 80° C. for 1 hour. This nonwoven fabric was thoroughly washed with pure water and used as a metal collecting material.

Adsorption and Collection of Valuable Metals in Seawater

Ten test samples of 20 cm×30 cm were cut out from the metal collecting material obtained from a nonwoven fabric as described above and packed in a basket made of a stainless net. The basket containing the test samples was moored in a sea area having an ocean current flowing at about 1 m/sec (about 3 m below the sea level) for about 3 weeks to collect valuable metals in seawater by adsorption. The seawater uranium level in this sea area was 3.1 ppb.

Recovery of Valuable Metals

The metal collecting materials having adsorbed valuable metals were pulled up from the sea and washed with the effluent of 0.1 N hydrochloric acid that had been passed through the collecting materials. Then, the collecting materials were packed in an elution column (50 mm in diameter) by stacking a total height of 40 cm of 2 rolls each consisting of 5 sheets of the collecting material of a nonwoven fabric of 20 cm×30 cm.

The column was eluted with 1200 ml of 0.1 N hydrochloric acid and the effluent from the column was stored for the next washing. This effluent contained calcium and magnesium at high levels but little valuable metals such as uranium or vanadium.

Then, 1200 ml of 0.5 N hydrochloric acid was passed through the column and 600 ml of water was further passed through the column to drive the remaining solution. The uranium level in a total of 1.8 liters of the effluent from the column was measured to be 4.7 mg/l. The collecting materials having been subjected to the second elution treatment were disassembled and the amount of uranium that could not be eluted with 0.5 N hydrochloric acid was determined to be below 0.1 mg, showing that 95% or more of the collected uranium could be efficiently eluted.

The effluent from the elution column obtained above was passed at SV3 through a metal resorption column packed with 50 ml of a bead-like chelate resin having a high stability constant for complexation with uranium (Unicellex UR-3100 made by Unitika) to resorb uranium onto the resin.

The uranium level in the effluent from the resorption column was determined to be 1.4 ppb, showing that most of uranium was resorbed to the chelate resin. The uranium level in the resin was 0.024%, which means that the seawater level of 3.1 ppb was concentrated about 8000-fold. Moreover, 90% of other metals in seawater such as calcium or magnesium were separated.

This column containing the chelate resin having resorbed uranium was eluted again with 150 ml of 2 N hydrochloric acid to recover 200 ml of a solution containing 40 mg/l uranium.

INDUSTRIAL APPLICABILITY

With metal collectors according to an aspect of the present invention, valuable metals in seawater or heavy metal ions in river water can be efficiently collected with the aid of natural forces. Thus, metal collectors of the present invention are very promising as a solution to energy, resource and environmental issues in future. Processes for eluting and recovering a metal from a metal collecting material according to another aspect of the present invention allow a target metal to be recovered in a purified state from a metal collecting material, so that recovery efficiency can be remarkably increased if they are applied to the technique for collecting valuable metals such as uranium or vanadium from seawater, or collecting and removing noxious metals such as cadmium, lead or copper in river water, or collecting and removing noxious metals such as mercury from industrial wastewater, or removing nickel from nickel plating wastewater. The eluent can be reused as many times as possible, whereby reducing costs for recovery. Therefore, processes of the present invention are very promising as a solution to energy, resource and environmental issues in future.

What is claimed is:

1. A process for eluting and recovering a metal from a metal collecting material, comprising:

(1) contacting the metal collecting material having absorbed a metal with a dilute eluent, (2) contacting the metal collecting material with an eluent more concentrated than in step 1 to recover the metal in the eluent; and (3) contacting a metal resorbing material with the eluate from step 2 to resorb the metal;

wherein the metal collecting material to be treated is prepared by using radiation-induced graft polymerization.

2. The process of claim 1, further comprising:

between steps 1 and 2, contacting the collecting material with an eluent having a concentration higher than that of the eluent in step 1 but lower than that of the eluent in step 2.

3. The process of claim 1, further comprising:

two or more elution steps between steps 1 and 2;

wherein the eluent in later steps is adjusted at a concentration higher than in early steps in said further elution steps.

4. The process of claim 1, further comprising:

washing the collecting material before step 1 with the effluent from step 1 and/or the effluent from step 3 which is from resorption of the target metal to a metal resorbing material.

5. The process of claim 1, wherein the effluent from step 3 which is from resorption of the target metal to a metal resorbing material is used as an eluent in step 1.

6. The process of claim 1, further comprising (4) contacting the metal resorbing material having resorbed the target metal from step 3 with an eluent more concentrated than the eluent used in step 3 to recover the target metal in the eluent.

7. The process of claim 1, wherein the metal collecting material to be treated contains an amidoxime group and/or imidodioxime group.

8. The process of claim 1, wherein the metal collecting material to be treated is in the form of a woven or nonwoven fabric consisting of a fiber assembly.

9. The process according to claim 1, wherein said metal is uranium or vanadium.

10. The process according to claim 1, wherein said metal collecting material is a chelate resin based on an amidoxime group.

11. The process according to claim 1, wherein said dilute eluent in step 1 is 0.01–0.1 N hydrochloric acid.

12. The process according to claim 1, wherein said eluent in step 2 is 0.2–1 N hydrochloric acid.

13. The process according to claim 1, wherein calcium and magnesium are eluted in step 1 but not uranium and vanadium.

14. The process according to claim 1, wherein 90% or more of uranium adsorbed to the collecting material is eluted in step 2.

15. The process according to claim 1, wherein said metal is a noxious heavy metal.

16. The process according to claim 1, wherein said metal is nickel or copper.

17. The process according to claim 1, wherein said collecting material has an iminodiacetate functional group.

18. The process according to claim 1, wherein said eluent of step 1 is used at a concentration that allows a non-target metal to be eluted but not a target metal.

19. The process according to claim 1, wherein said eluent of step 2 is used at a concentration that allows target metals to be eluted.

20. The process according to claim 1, wherein said metal-resorbing material is a member selected from the group consisting of metal-resorbing materials having a chelating group having a high stability constant for complexation with uranium in acidic solutions.

21. The process according to claim 1, wherein said collecting material has a thiol group.

22. The process according to claim 1, wherein said metal is uranium.

* * * * *